United States Patent [19]

Hills et al.

[11] 4,130,217

[45] Dec. 19, 1978

[54] SEAL ARRANGEMENT FOR FLOATING ROOF STORAGE TANKS

[75] Inventors: Richard E. Hills, Coraopolis; Frank R. Neely, Wexford; Derek K. Neely, Pittsburgh; John T. Malinowski, Hartstown, all of Pa.

[73] Assignee: Pittsburgh-Des Moines Steel Company, Pittsburgh, Pa.

[21] Appl. No.: 837,230

[22] Filed: Sep. 27, 1977

[51] Int. Cl.² .................. F16J 15/02; B65D 25/34; B65D 87/36
[52] U.S. Cl. .................................. 220/226; 277/12; 277/138
[58] Field of Search ............... 277/12, 138, 148; 220/222-226

[56] References Cited

U.S. PATENT DOCUMENTS

| 1,698,158 | 1/1929 | Glass | 220/222 |
| 3,019,935 | 2/1962 | Anderson | 220/224 |
| 3,043,468 | 7/1962 | Horner | 220/226 |

FOREIGN PATENT DOCUMENTS

| 217029 | 9/1958 | Australia | 220/222 |
| 883087 | 11/1961 | United Kingdom | 220/224 |
| 929723 | 6/1963 | United Kingdom | 220/226 |

Primary Examiner—Robert S. Ward, Jr.
Attorney, Agent, or Firm—Shoemaker and Mattare, Ltd.

[57] ABSTRACT

A seal arrangement for a floating roof in a storage tank, wherein the roof is spaced at its outer periphery from the inner surface of the tank, thus defining a rim space, includes support members secured at one edge to the roof and extending angularly outwardly into close proximity with the tank wall, and yieldable material carried by the support members in a position to engage the tank wall and effect a seal between the roof and tank wall, said yieldable material having a predetermined shape, whereby engagement thereof with the tank wall covers a predetermined, varying area upon variations in the rim space to thus maintain acceptable contact pressure with the tank at different rim spaces between the roof and tank wall, while at the same time maintaining an effective seal.

24 Claims, 11 Drawing Figures

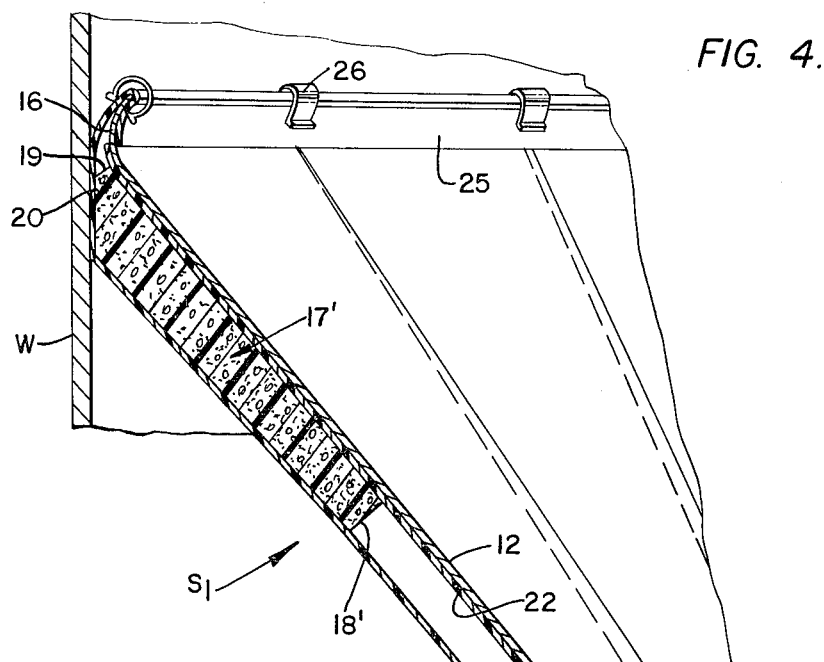
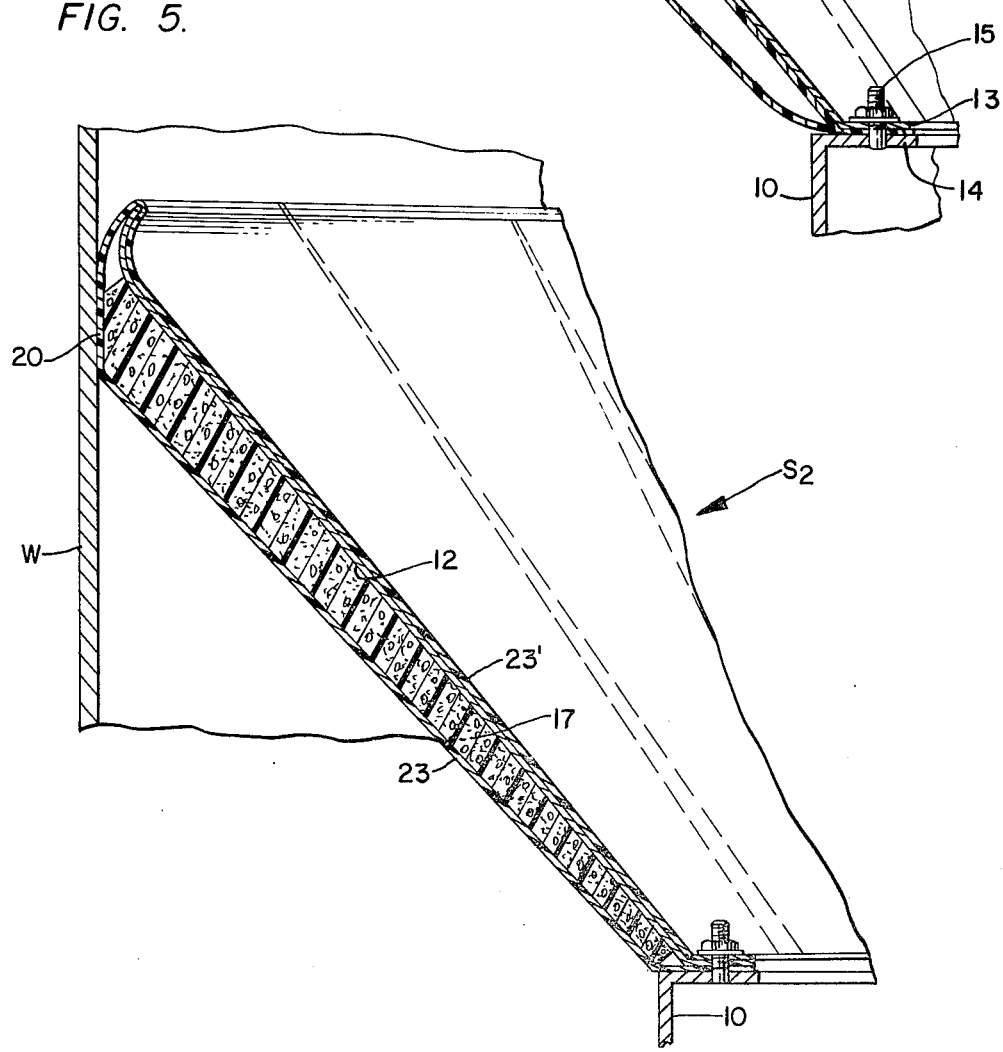

SEAL ARRANGEMENT FOR FLOATING ROOF STORAGE TANKS

BACKGROUND OF THE INVENTION

This invention relates generally to seals for floating roofs in storage tanks for storing petroleum products or other liquid materials.

In such tanks, several problems are encountered with respect to providing a seal between a floating roof in the tank and the tank wall. The floating roof typically floats on the product, and as the product is introduced into the tank to fill the tank and removed therefrom, the roof rises and falls in the tank. Thus, the roof must be spaced at its outer periphery from the tank wall in order to prevent binding of the roof in the tank as the roof rises and falls. This space exposes the product stored in the tank, thus permitting the product to evaporate and be lost to atmosphere and also permitting rain, snow, debris and the like to enter the product through the space. Accordingly, many different types of seals have been devised in the prior art in order to seal this space as the roof rises and falls in order to prevent loss of the product to atmosphere and also to prevent entry of contaminants into the product through the space. Moreover, such seals must not only seal the space to prevent evaporation of the product or contamination thereof, but must also be capable of moving along the inner surface of the tank wall as the roof rises and falls without binding or impeding normal operation of the floating roof.

Examples of some prior art seals are: mechanical seals having steel shoes which are biased against the tank wall and supported from the floating roof, with a fabric seal extending between the steel shoes and the roof; foam filled bags or envelopes which extend in the space defined by the roof and tank wall; and liquid filled tubes suspended or supported in the space between the roof and tank and engaged therebetween. All of these seals are effective to at least a certain degree in preventing evaporative loss of the stored product and also in preventing contamination of the product by rain, snow or debris. Further, these seals are all flexible or yieldable and thus accommodate themselves, at least to a certain degree, to irregularities in the tank shape or surface, thereby maintaining a seal even though the tank may not be perfectly cylindrical or even though weld deformaties or rivet heads and the like are exposed at the tank inner surface. However, all such prior art seals are relatively fixed insofar as their configuration and position is concerned relative to the roof and tank and the space therebetween. In other words, during normal usage the rim space between the roof and tank varies as the roof rises and falls, or even while the roof remains stationary at a predetermined level in the tank, and the seals are either compressed or they expand in the rim space as the rim space changes. However, some such prior art seals are subject to excessive wear at decreased or minimum rim spaces, and at increased or maximum rim spaces, excessive gaps between the seal and the tank wall sometimes occur, thus enabling product to evaporate and be lost to atmosphere or enabling contaminants to enter the product through the gap.

Because of these problems, additional seal means or other arrangements are now being considered to compensate for the deficiencies in the primary seals presently used in the rim space between a floating roof and the tank wall. Recent studies have indicated that faulty seals result in a substantial quantity of the stored product being lost to atmosphere through evaporation, thereby not only depleting the supply of fuel, but also polluting the atmosphere. In view of the serious shortage of energy resources, and particularly petroleum products such as would typically be stored in a tank with which the present invention is concerned, the importance of an effective seal in the rim space between a floating roof and a tank wall is readily apparent. In fact, the California Air Resources Board has recently promulgated a Rule 463 requiring that storage tanks comply with certain parameters regarding loss of product to the atmosphere.

Many efforts are presently being made to comply with these parameters, ranging from expensive and complicated equipment which recovers vapors emitted from the storage tank and pumps them to a station where the vapors are reliquefied and converted to usable energy materials, to the provision of secondary seals used in conjunction with the conventional primary seals.

Moreover, the floating roofs or decks used in such tanks may be used either as the roof itself in an open top tank or a fixed outer roof may be used on the tank, in which case, the floating roof would comprise an inner deck. When the floating roof is used in an open top tank, the seal must be capable of withstanding weather and the like. Further, the aforementioned recent studies have indicated that wind forces play an important part in evaporative loss of the stored product, in that the aerodynamics associated with the tank and floating roof construction are such that wind forces tend to enter the space beneath or adjacent the seal on the downwind side of the tank and move around this annular space defined by the tank, seal, roof and stored product and exit from the space at the upwind side of tank carrying vapors of the stored product into the atmosphere.

OBJECTS OF THE INVENTION

Therefore, it is an object of this invention to provide a seal for sealing the rim space between a floating roof and the side wall of a tank, in which the seal is structured and configured such that it presents an acceptable contact pressure with the tank wall at all rim spaces typically encountered during normal usage, thereby reducing wear on the seal, while at the same time maintaining an effective seal between the roof and tank wall.

Another object of the invention is to provide a seal for the rim space between a floating roof and tank wall, wherein the seal accommodates itself to varying rim spaces between the roof and tank wall, and wherein the seal is exceptionally simple and economical in construction and is arranged such that rain, snow and the like are prevented from entering the rim space between the roof and tank.

A still further object of the invention is to provide a secondary seal for use in conjunction with a primary seal in the rim space between a floating roof and tank wall, wherein the secondary seal provides a weather shield for the primary seal, and at the same time effectively prevents escape of vapors and the like from the rim space, the secondary seal also being configured such as to present a minimum contact pressure with the tank wall at all rim spaces typically encountered during normal usage of the seal.

BRIEF DESCRIPTION OF THE DRAWINGS

FIG. 4 is a view similar to FIG. 2 of a first modification of the seal according to the invention.

FIG. 5 is a view similar to FIG. 4 of a second modification of the seal of the invention.

DETAILED DESCRIPTION OF THE INVENTION

Figure 1:
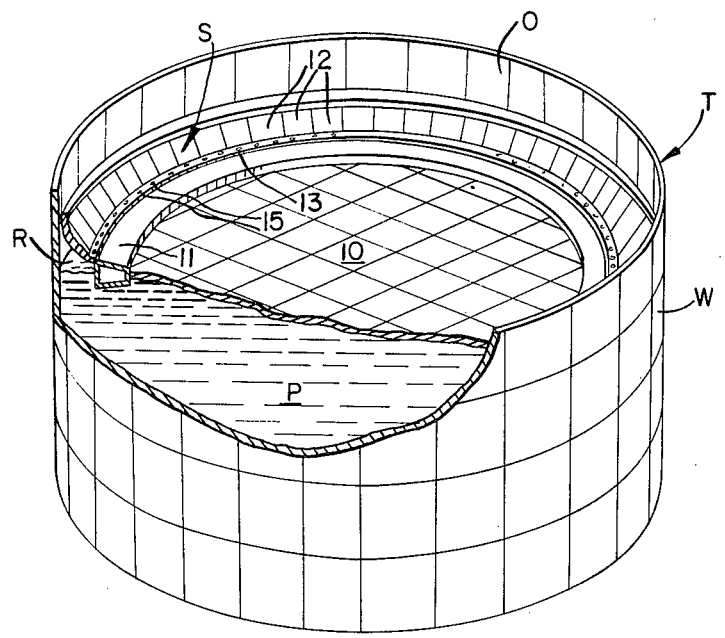
FIG. 1 is a perspective view, with portions broken away, of an open topped tank having a floating roof and seal according to the invention therein.

In the drawings, wherein like reference numerals indicate like parts throughout the several views, an open topped tank T has a side wall W with an open top O and closed bottom (not shown) for storing a liquid product P, such as a petroleum product or the like. A floating roof 10 of substantially conventional construction having in one form of the invention an annular peripheral pontoon 11 floats on the product P, and in order to move freely with the product P as the liquid level of the product changes, is spaced from the wall of the tank defining a rim space R. This space R is sealed by means of a seal S secured to the roof 10 and extending angularly across the space R into sealing engagement with the wall W of tank T. The rim space varies from a nominal distance, as indicated at R in FIG. 1, for example, to a maximum, R max. in FIG. 2 and a minimum, R min. in FIG. 3. In a typical tank, this space could vary from 3 inches to 10 inches or more between the minimum and maximum rim spaces.

Figure 3:
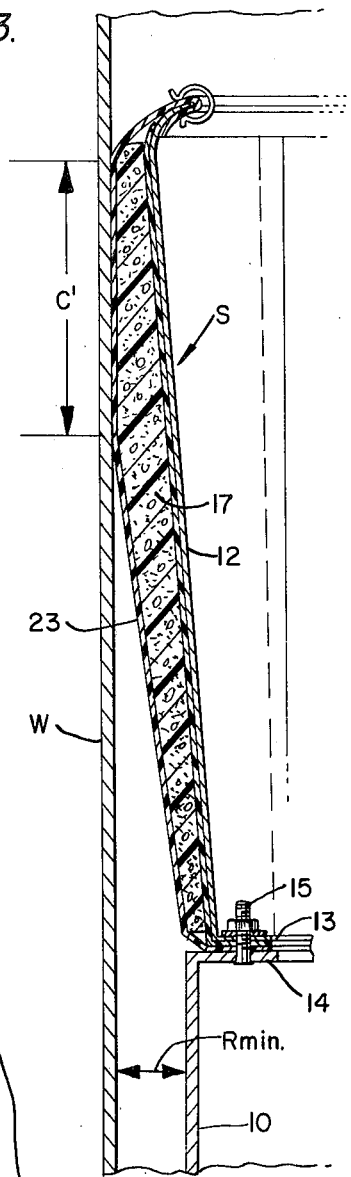
FIG. 3 is a view similar to FIG. 2, showing the seal in its operative position for a minimum rim space between the roof and tank side wall.
Figure 2:
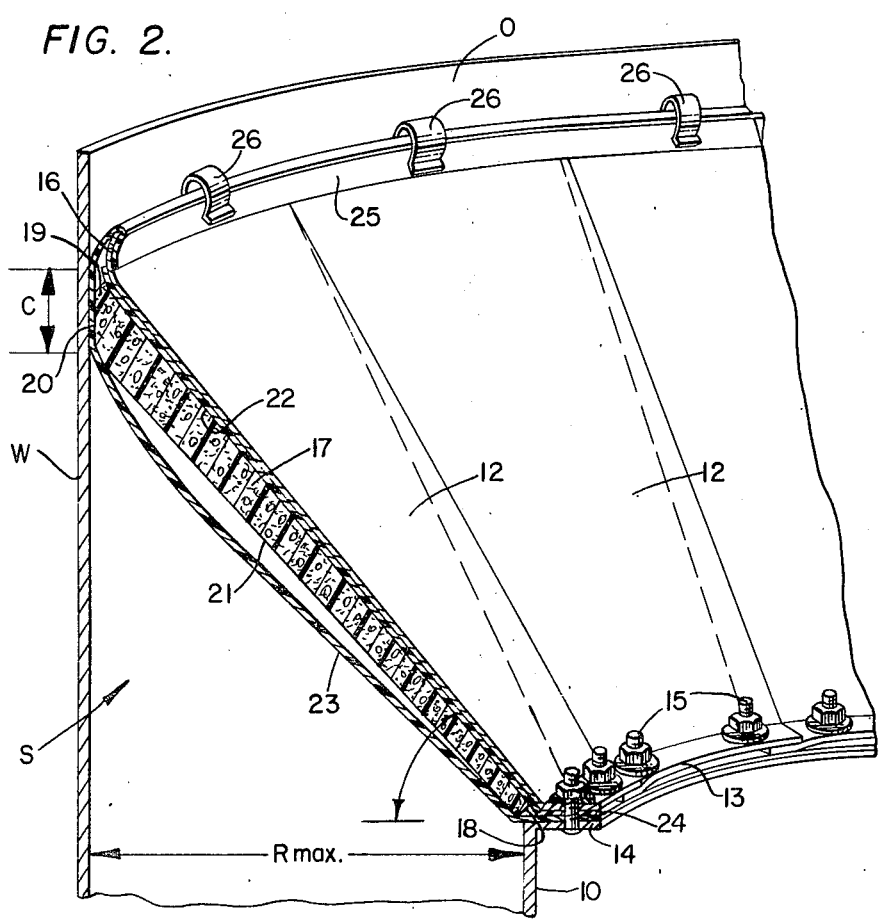
FIG. 2 is a greatly enlarged, fragmentary view in section, showing details of a first form of seal according to the invention, with the seal shown in its operative position for a maximum rim space between the floating roof and tank side wall.

A preferred construction of the seal itself is illustrated in FIGS. 2 and 3, and the seal S comprises a plurality of generally rectangular or trapezoidally shaped plates 12 overlapped at their adjacent side edges as indicated in dotted lines in FIG. 2 and having the inner or lower edge thereof bent to define a horizontally projecting flange 13 which is bolted to an attaching flange 14 on the roof 10 by means of a pair of bolts 15 extended through the flange 13 adjacent opposite ends thereof. The plates 12 extend upwardly at about 50° from the horizontal flange 13 and have their outer or upper ends curved upwardly and rearwardly at 16. The plates are of lightweight construction and are preferably weather-resistant. An example of one material which is suitable is 22 gauge Corten steel. A body of yieldable material 17 is carried by the plates 12 on the underside thereof and tapers from a relatively narrow inner or lower edge 18 to a wider upper or outer edge 19. One corner of the wide edge 19 is cut off or shaped to define a flat surface 20 having a width C and extending parallel to the plate of the wall W in the position of the roof shown in FIG. 2, wherein the rim space is at a maximum distance R max. The bottom surface 21 of the body 17 then tapers or extends straight from the bottom edge of surface 20 to the inner or rear edge 18. One suitable material for the body 17 is a polymeric foam material, such as an open cell polyurethane foam. A water impervious film 22 is interposed between the body 17 and plates 12 for preventing entry of water and the like into the body 17. Preferably, the film 22 extends beneath several adjacent plates and is overlapped a sufficient distance to insure that water and the like does not seep between adjacent edges of sections of film and into the body 17. For example, the film may be overlapped a distance of about one foot for plate widths of approximately 13 inches. Alternatively, of course, the film could extend uninterruptedly around the circumference of the roof. One suitable material is a polyurethane film having a thickness of about 5 mils. The film 22 may be adhesively secured to either the body 17 or the plates 12 or it may simply be held in position between the body 17 and plates without separate securing or fastening means.

A scuff band 23 is secured at its lower edge 24 between the flanges 13 and flange 14 and extends upwardly around the upper or outer end of the body 17 and has its upper edge 25 folded rearwardly over the upper edge 16 of plate 12 and clamped thereat by means of a plurality of clamps, such as spring clips or the like 26. The scuff band serves to retain the body 17 and film 22 in place relative to the plates 12 and protects the body 17 from wear. A suitable material for the scuff band is a polyurethane on nylon fabric. The scuff band may also be provided in segments overlapped approximately one foot at their adjacent edges.

In a typical construction as noted previously, the plates 12 extend upwardly at a minimum angle of about 50° to the horizontal and are approximately 13 inches wide. The body 17 of foam material has an overall length of from about 15½ to slightly more than 18 inches and a thickness at the widest point of about 1¼ inches. The sealing surface or contact surface C has a width of from about 1⅞ to about 2½ inches and the seal S is held in place by means of ⅜ inch bolts with washers and nuts thereon spaced at about 6 inch centers around the circumference of the roof 10. With this configuration and structure, the seal S effectively seals the maximum rim space R max. as seen in FIG. 2, with the surface 20 lying flat against the wall W and contacting the wall over a space or area C. In this position, with the roof spaced a maximum distance from the wall, the surface 20 engages the wall with reduced force, and accordingly, the wear on the scuff band 23 is at a minimum, while at the same time the small contact height provides an effective seal.

On the other hand, when the rim space is at a minimum, R min. as seen in FIG. 3, the plates 12 are flexed inwardly and upwardly and the body 17 is deformed, contacting the wall W over a large area C'. Thus, at the smaller rim space, the seal contacts the wall over a larger area, thus distributing the force and obtaining a relatively low pressure contact, whereby wear on the scuff band 23 is kept to a minimum. In other words, in FIG. 2 when the rim space is at a maximum, the plates 12 are in substantially their normal or at rest position, and the seal engages the wall over a relatively small area C with a contact pressure well within acceptable limits to keep wear on the scuff band 23 to a minimum, and yet at the same time provide an effective seal. In FIG. 3, with the rim space at a minimum, the plates 12 are flexed upwardly and inwardly, thus exerting a substantial outward force or pressure against the body 17, but in this position the seal engages the wall over a large area C', whereby the greater force is distributed over a larger area, maintaining the pressure of contact within acceptable limits and keeping wear on the scuff band 23 to a minimum while at the same time providing an effective seal. During most of the time in which the seal is in use, it would assume a position intermediate to that shown in FIGS. 2 and 3 and the contact surface like surface 20 of FIG. 2 on the thick or outer end of the body 17 thus provides an area for distribution of the force to maintain an appropriate contact pressure.

In FIG. 4 a first modification of the invention is indicated generally at $S_1$ and is substantially identical to the form of the invention previously described, except that the body of resilient material 17' terminates at an inner or lower edge 18' approximately midway between the upper or outer edge 16 of plates 12 and the inner or lower edge of flange 13 thereof. With this form of the invention, the amount of material required for the resilient body 17' can be reduced in comparison with that in FIGS. 2 and 3 and yet the body 17' extends over the area which will encounter or contact the wall W, whereby an effective seal is maintained at all times.

A second modification of the invention is indicated generally at $S_2$ in FIG. 5 and is substantially identical with the forms of the invention previously described, except that the scuff band 23' defines a loop extending completely around the plates 12 and body 17 with the opposite ends 25' and 27 of the scuff band clamped to the attaching flange 14 of roof 10 along with the horizontally extending annular flange 13 of plates 12. Additionally, the film 22 is eliminated in this form of the invention, since the top or upper course or extent of the scuff band 23' serves to keep moisture from entering the space beneath the plates 12.

Figure 6:
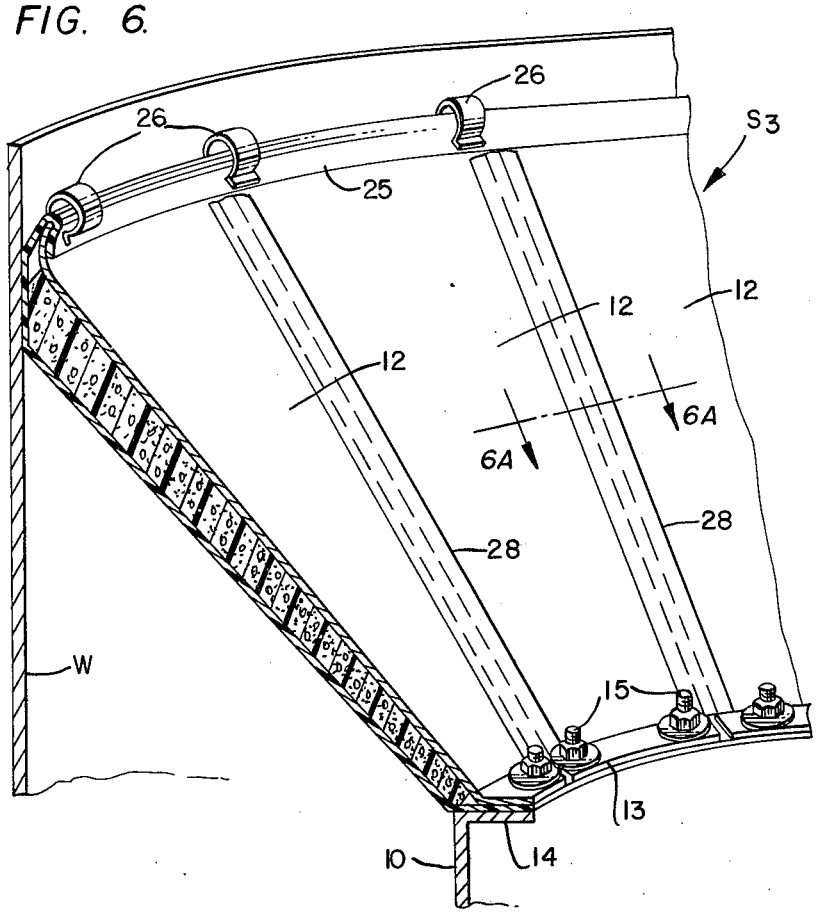
FIG. 6 is a view similar to FIG. 2 of a third modification of the seal of the invention.
Figure 6A:
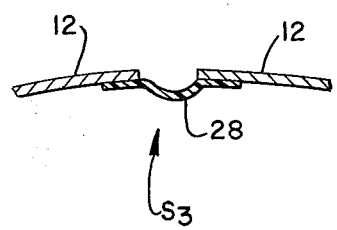
FIG. 6a is an enlarged view in section taken along line 6a—6a in FIG. 6.

A third modification of the invention is indicated generally at $S_3$ in FIGS. 6 and 6a, and is identical with the form of the invention shown in FIGS. 2 and 3, except that the plates 12 are not overlapped at their adjacent side edges, and instead, a sealing tape or the like 28 is applied over the gap G between adjacent side edges of adjacent plates 12 to seal the gap against entry of foreign material between the plates to the space therebeneath. The tape 28, for example, may comprise a polyurethane foam tape with contact adhesive used to hold it in place.

Figure 7:
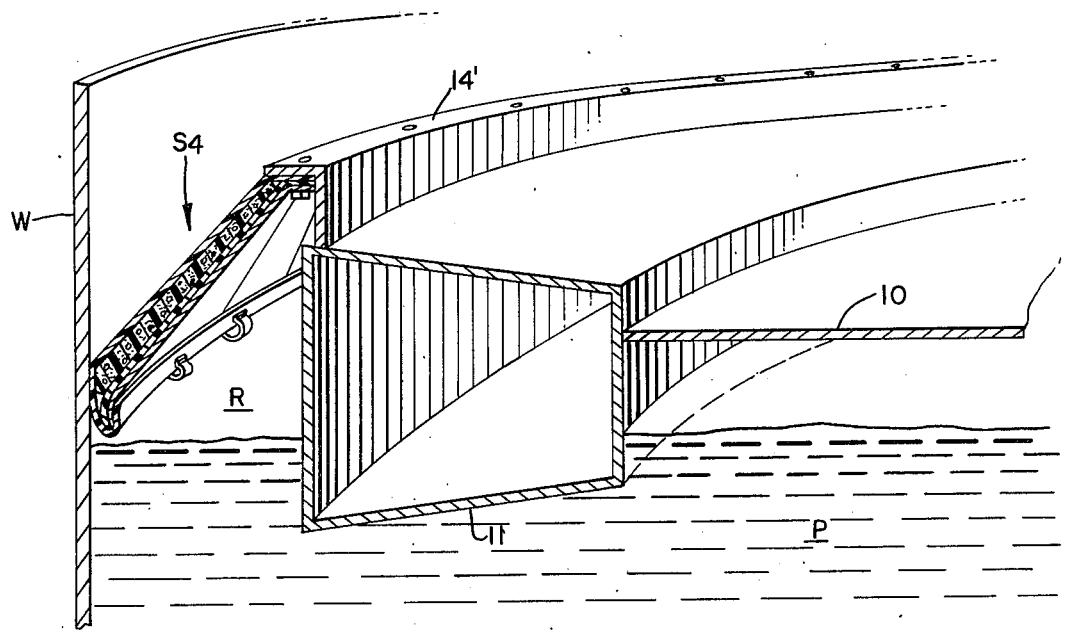
FIG. 7 is a view similar to FIG. 2 of a fourth modification of the invention, wherein the seal is inverted from the form of the invention in FIG. 2 and projects downwardly into the rim space.

A fourth modification of the invention is indicated generally at $S_4$ in FIG. 7, and in this form of the invention, the seal $S_4$ projects outwardly and downwardly into the rim space R to effect a seal with the wall W of the tank, rather than upwardly and outwardly as in the previous forms of the invention. In all other respects the seal $S_4$ may be constructed in accordance with any one of the previous forms of the invention, although as specifically illustrated in this figure, the seal $S_4$ is identical to the seal construction shown in FIGS. 2 and 3.

Figure 8:
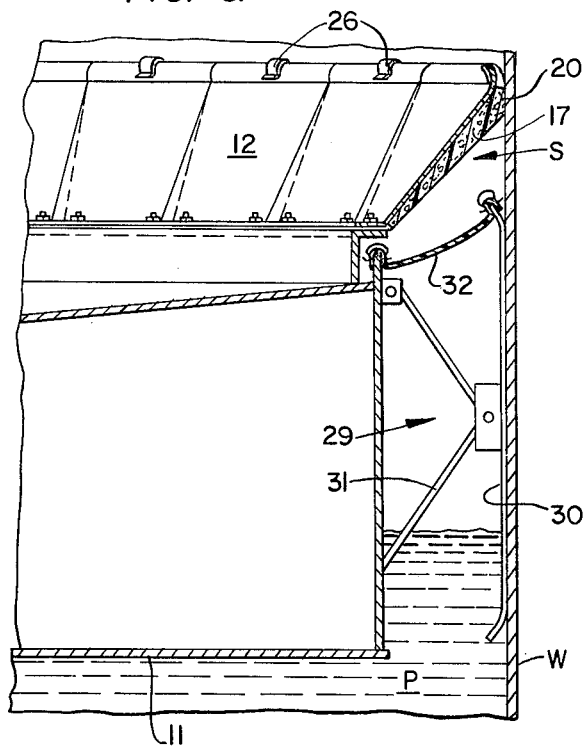
FIG. 8 is a fragmentary view in section of a tank having a floating roof therein and shows a fifth modification of the invention wherein a primary seal of conventional construction is used to seal the rim space between the roof and tank and a secondary seal according to the invention is used in conjunction with the primary seal.

In FIG. 8 a seal S identical to that shown in FIGS. 2 and 3 is secured to a pontoon 11 and extends into sealing engagement with the wall W of tank T and the seal S is used as a secondary seal in conjunction with a primary seal 29 of the mechanical seal or shoe seal type, wherein steel shoes 30 are held by springs 31 in sliding engagement with the wall W and a fabric seal 32 closes the space between the upper edge of shoes 30 and the roof or pontoon 11. Thus, when used in this manner, the seal S not only serves as a weather seal for the primary seal 29, but also serves as a secondary seal to prevent loss of the product P due to evaporation.

Figure 9:
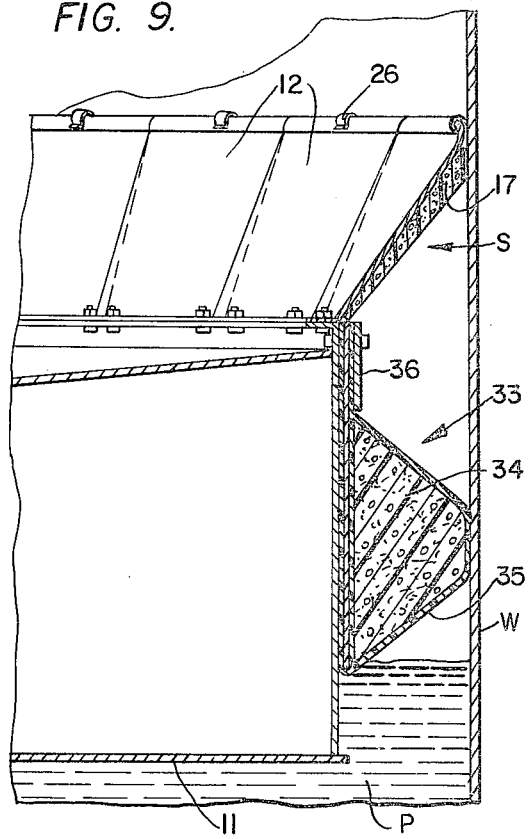
FIG. 9 is a view similar to FIG. 8 of a sixth modification of the invention, wherein a different form of conventional primary seal is used with the secondary seal of the invention.

In FIG. 9 a sixth modification is shown wherein the seal S as illustrated in FIGS. 2 and 3 is used in conjunction with a primary seal 33 of the type commonly referred to as a foam seal, wherein an open cell foam material 34 is housed in a coated fabric 35 and normally suspended above the surface of product P by a clamping ring or the like 36 bolted to the roof or pontoon 11. The secondary seal S has particular utility when used with a primary seal such as a foam seal 33, since it prevents entry of water, snow and the like into the space or recessed area defined between the pontoon 11 and wall W and above the primary seal 33, in addition to its other advantages and functions as discussed in connection with FIG. 8.

Figure 10:
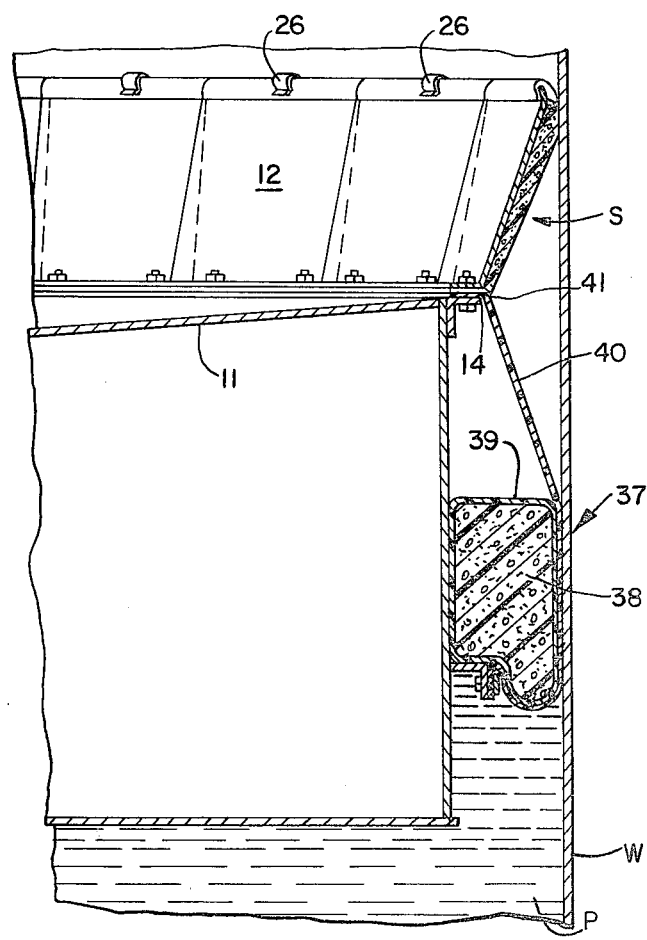
FIG. 10 is a further view similar to FIG. 8 of a seventh modification of the invention, wherein yet a different type of conventional primary seal is used with the secondary seal of the invention.

A seventh modification of the invention is illustrated in FIG. 10, wherein a seal S, such as in FIGS. 2 and 3, is used in combination with a primary seal 37 of the type commonly referred to as TUBESEAL, wherein a liquid 38 is housed or confined within a tube 39 suspended by a web 40 bolted at its upper edge 41 to the flange 14 on the pontoon 11 and bolted or otherwise secured at its lower edge 41 to a support flange 42 on the pontoon 11. In this form of the invention the seal S performs substantially the same functions and has substantially the same advantages as described in connection with FIG. 9.

The seal S, as well as the seals $S_1$ through $S_4$ all have effective resistance to the elements, and particularly to ultraviolet light, wind and rain because of the fact that the metal plates 12 are on the upper surface thereof and are exposed to the elements and protect the remaining portions of the seal. Additionally, and particularly with reference to FIGS. 8-10, the secondary seal S may readily be pulled back from the wall W to permit access to the primary seals 29, 33 and 37, whereby the primary seals may be inspected. Additionally, and as described in greater detail hereinbefore, the particular construction of the seals S and $S_1$ through $S_4$ have excellent frictional wear resistance of the seal material because of the action of the seal in spreading the contact pressure over a relatively large area when the rim space is at a minimum whereby wear on the seal is kept to a minimum and yet an effective seal is provided. Additionally, the body 17 of yieldable material in the seals makes the seal compatible with tank surface irregularities, such as weld reinforcement and tank shell distortion. Further, the seal of the invention is compatible with stored product and has an installed cost comparable with competitive seals. Still further, and importantly, the seal of the present invention has the ability to accommodate tank full conditions. In other words, some operators fill the tank to the point where the upper edge of the roof comes out of the tank itself. At this point the secondary seal S, as in FIGS. 8-10, for example, comes out of the tank and projects above the open end O thereof. Because of the structure and shape of the seal of the present invention, however, it may be reinserted into the open upper end of the tank as the roof is lowered without causing any damage to the seal upon reinsertion into the tank shell.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

We claim:

1. A seal arrangement for a floating roof in a storage tank, wherein the roof is spaced at its periphery from the tank side wall, defining an annular rim space, comprising: a plurality of support members each having an inner edge, an outer edge and opposite side edges, and secured at their inner edges to the roof and extending in side-by-side relationship angularly outwardly from the roof into close proximity at their outer edges with the tank side wall, said support members being resiliently yieldable whereby they accommodate themselves to different rim spaces; and resilient means carried by the support members in a position to engage the tank side wall and effect a seal therewith, said resilient means having a predetermined configuration defining at least two different contact areas, such that for minimum rim spaces the resilient means presents a large contact area to the tank, and for maximum rim spaces the resilient means presents a small contact area to the tank, whereby the contact pressure between the resilient means and tank remains below a predetermined value, and wear to the seal is thus kept to a minimum, while an effective seal is maintained.

2. A seal arrangement as in claim 1, wherein the support members comprise plates formed of a weather-resistant material, said plates defining a weather shield.

3. A seal arrangement as in claim 2, wherein the plates are formed of metal and extend angularly upwardly from the roof outwardly to adjacent the tank wall in spanning relationship to the rim space.

4. A seal arrangement as in claim 3, wherein the resilient means comprises a body of resiliently yieldable material carried by the plates on the underside thereof, said body of material having a first planar surface of relatively small area normally disposed parallel to the surface of the tank wall and urged against the tank wall to effect a seal therewith for large rim spaces and a second planar surface extending angularly from the first surface toward the roof, said body being deformed at smaller rim spaces whereby portions of said first and second surfaces coact to define a planar contact area with the tank wall which is greater than the area of the first planar surface, whereby the contact pressure between the seal and tank wall is maintained below a predetermined value.

5. A seal arrangement as in claim 4, wherein the body of resilient material comprises a plurality of blocks of foam material underlying the plates.

6. A seal arrangement as in claim 4, wherein a fabric scuff band extends between the body of resilient material and the adjacent tank wall to protect the body of resilient material from wear.

7. A seal arrangement as in claim 6, wherein the plates are overlapped at their adjacent side edges.

8. A seal arrangement as in claim 6, wherein the plates are spaced apart at their adjacent side edges and the spaces or gaps between adjacent plates are closed by strips of tape.

9. A seal arrangement as in claim 1, wherein the resilient means includes a fabric scuff band and a body of resilient material, said scuff band extending between the body of resilient material and the adjacent tank wall to protect the body of resilient material from wear.

10. A seal arrangement as in claim 9, wherein said support members comprise plates formed of a weather-resistant material defining a weather shield.

11. A seal arrangement as in claim 10, wherein the liquid impervious film is disposed between the plates and the body of resilient material to prevent entry of foreign matter into the body of resilient material.

12. A seal arrangement for a floating roof in a storage tank, wherein the roof is spaced from the tank side wall, thus defining an annular rim space, comprising: a primary seal of conventional construction for sealing the rim space; and a secondary seal above the primary seal and extending from the roof across the rim space into sealing engagement with the tank wall, said secondary seal also including weather-resistant means defining a weather shield protecting the primary seal, said secondary seal constructed to present a large contact area to the tank for minimum rim spaces and a small contact area to the tank for maximum rim spaces, whereby the contact pressure between the secondary seal and tank wall remains below a predetermined value and wear to the secondary seal is thus kept to a minimum while an effective seal is maintained.

13. A seal arrangement as in claim 12, wherein the roof has an annular peripheral flange thereon, said secondary seal secured to the flange.

14. A seal arrangement as in claim 13, wherein the weather-resistant means comprises a plurality of metal plates disposed in edge-to-edge relationship and extending around the periphery of the roof in overlying relationship to the rim space.

15. A seal arrangement as in claim 14, wherein the secondary seal includes resiliently yieldable members carried by the plates in a position to engage the tank wall, said resiliently yieldable members being deformable to conform to tank wall surface irregularities.

16. A seal arrangement as in claim 15, wherein said resiliently yieldable members each have a first planar surface of relatively small area normally disposed parallel to the surface of the tank wall and urged against the tank wall to effect a seal therewith for large rim spaces, and a second planar surface extending angularly from the first surface toward the roof, said resiliently yieldable members being deformed at smaller rim spaces whereby portions of said first and second surfaces coact to define a planar contact area with the tank wall which is greater than the area of the first planar surface, whereby the contact pressure between the resiliently yieldable means and the tank wall is maintained below a predetermined value.

17. A seal arrangement as in claim 16, wherein a fabric scuff band extends between the resiliently yieldable members and the adjacent tank wall to protect the resiliently yieldable members from wear.

18. A seal arrangement as in claim 17, wherein a water impervious film is disposed between the plates and the resiliently yieldable members.

19. A seal arrangement as in claim 6, wherein the scuff band defines a loop extending around the body of resilient material and the plates, with opposite ends of the loop secured to the periphery of the roof.

20. A seal arrangement as in claim 6, wherein the scuff band comprises a strip of material having one end thereof secured to the periphery of the roof and the other end secured to the outer edge of the plates, said other end of the scuff band being secured to the outer edge of the plates by means of resilient spring clips.

21. A seal arrangement as in claim 2, wherein the plates are formed of metal and extend angularly downwardly from the roof outwardly to adjacent the tank wall.

22. A seal arrangement for a floating roof in a storage tank, wherein the roof is spaced at its periphery from the tank side wall, defining an annular rim space, comprising: a plurality of support members each having an inner edge, an outer edge and opposite side edges, and secured at their inner edges to the roof and extending in side-by-side relationship angularly outwardly from the roof into close proximity at their outer edges with the tank side wall, said support members being elastically bendable whereby they accommodate themselves to different rim spaces; and resilient means carried by the support members in a position to engage the tank side wall and effect a seal therewith, said resilient means including a foam polymeric core of predetermined configuration and a wear resistant surface, such that for minimum rim spaces the resilient means presents a large contact area to the tank, and for maximum rim spaces the resilient means presents a small contact area to the tank, whereby the contact pressure between the resilient means and tank remains below a predetermined value, and wear to the seal is kept to a minimum, while an effective seal is maintained.

23. A seal arrangement for a floating roof in a storage tank, wherein the roof is spaced at its periphery from the tank side wall, defining an annular rim space, comprising: a plurality of support members each having an inner edge, an outer edge and opposite side edges, and secured at their inner edges to the roof extending in side-by-side relationship angularly outwardly from the roof into close proximity at their outer edges with the tank side wall, said support members being resiliently yieldable whereby they accommodate themselves to different rim spaces; and resilient means carried by the support members in a position to engage the tank side wall and effect a seal therewith, said resilient means having width and length dimensions substantially the same as the plurality of support members and thickness less than about several inches and being made of a soft foam form of a polymeric substance, with a wear resistant surface in contact with the tank side wall, whereby the contact pressure between the resilient means and tank remains below a predetermined value, and wear to the seal is thus kept to a minimum, while an effective seal is maintained.

24. A seal arrangement for a floating roof in a storage tank, wherein the roof is spaced at its periphery from the tank side wall, defining an annular rim space, comprising: a plurality of support members each having an inner edge, an outer edge and opposite side edges, and secured at their inner edges to the roof and extending in side-by-side relationship angularly outwardly from the roof into close proximity at their outer edges with the tank side wall, said opposite side edges of adjacent support being substantially sealed against ingress of the sun, wind and the elements; said support members being resiliently yieldable whereby they accommodate themselves to different rim spaces; and resilient means carried by the support members in a position to engage the tank side wall and effect a seal therewith, said resilient means having a predetermined configuration and softness, such that for minimum rim spaces the resilient means presents a large contact area to the tank, and for maximum rim spaces the resilient means presents a small contact area to the tank, whereby the contact pressure between the resilient means and tank remains below a predetermined value, and wear to the seal is thus kept to a minimum, while an effective seal is maintained.

* * * * *